United States Patent [19]

Steegmuller

[11] 3,735,990
[45] May 29, 1973

[54] SEALING STRUCTURE FOR ROTARY MOTION TRANSMITTING DEVICE

[75] Inventor: Helmut Steegmuller, Affalterbach, Germany

[73] Assignee: Robert Bosch GmbH, Stuttgart, Germany

[22] Filed: June 25, 1971

[21] Appl. No.: 156,841

[30] Foreign Application Priority Data

June 26, 1970 Germany.....................P 20 31 608.9

[52] U.S. Cl.................................................277/8
[51] Int. Cl..........................F16k 41/08, F16j 15/10
[58] Field of Search.....................................277/8, 59

[56] References Cited

UNITED STATES PATENTS 2,365,146  12/1944  Wichorek................................277/8

*Primary Examiner*—George E. Lowrance
*Assistant Examiner*—Robert I. Smith
*Attorney*—Michael S. Striker

[57] ABSTRACT

A sealing structure for a system which rotates a driven coupling member in a contaminated compartment has a sleeve which extends into an opening of a wall of the cell defining the contaminated compartment and has an internal annular shoulder sealingly engaging an external shoulder of the driven coupling member in the compartment. The driven coupling member has an axial bore which is sealed from the contaminated compartment and can receive a torque-transmitting part of a second coupling member which is located without the compartment and is driven by a motor through the intermediary of a clutch. The sleeve is in sealing engagement with the wall, and the likelihood of leakage between the sleeve and the driven coupling member is further reduced by the provision of one or more packings, U-rings and/or liquid seals. The two shoulders bear against each other to prevent leakage of contaminating matter from the compartment when the second coupling is detached. The opening in the wall is evacuated prior to detechment of the second coupling member and remains evacuated until after attachment of a fresh second coupling member.

4 Claims, 1 Drawing Figure

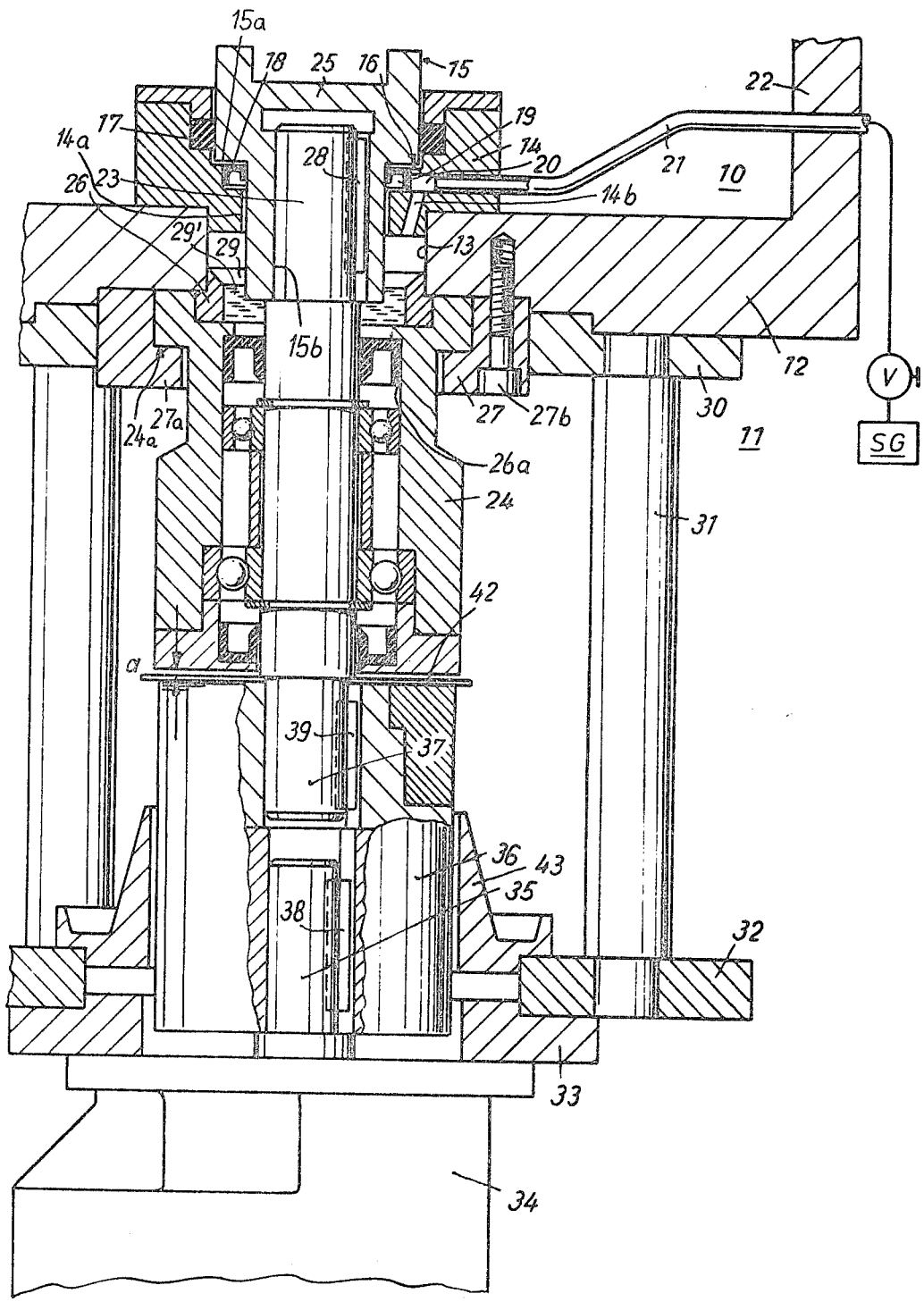

SEALING STRUCTURE FOR ROTARY MOTION TRANSMITTING DEVICE

BACKGROUND OF THE INVENTION

The present invention relates to sealing structures in general, and more particularly to improvements in sealing systems which can be utilized to prevent leakage between two compartments separated from each other by a wall which is traversed by rotary parts including one or more driven elements in one of the compartments and one or more driving elements in the other compartment. Still more particularly, the invention relates to sealing structures which can be utilized to seal a contaminated area or compartment from an uncontaminated area or compartment while enabling one or more rotary parts in the contaminated area to receive torque from one or more rotary parts in the uncontaminated area.

It is known to manufacture ceramic burner elements for nuclear reactor systems in a fluid-tight cell surrounding a compartment which is contaminated with reactive dust and must be sealed from the surrounding area. It is also known to install in a cell an automatic production line for parts which are surrounded by a contaminated atmosphere. Such production line comprises moving components which receive torque from one or more prime movers installed without the cell. Therefore, it is necessary to provide one or more driving connections which extend through one or more walls of the cell in order to transmit torque to driven components of a production line therein. For example, certain components of an air-tightly enclosed production line which is installed in a contaminated atmosphere may require impulses at predetermined intervals whereby such impulses trigger a sequence of operations. The impulses must be transmitted by rotary parts which extend through the cell and into the contaminated area.

German publication (Offenlegungsschrift) No. 1,812,445 discloses a sealing structure which can be utilized to prevent leakage around rotary parts extending from an uncontaminated compartment into a contaminated compartment. The sealing structure includes a flange having a bore for the passage of a rotary shaft which extends into a reactor chamber and a driving member which is supported by and sealingly engages the flange. If the driving member requires replacement, it is necessary to employ a specially designed housing which is placed over the flange, and a device for bringing about an equalization of pressures in the reactor chamber and in the interior of the housing. Still further, it is necessary to provide intercepting devices which collect escaping fluids and must be closed during removal of a defective driving member as well as a number of conduits which are to be opened during such replacement. The flange accommodates spreading elements which must be withdrawn from its interior prior to replacement or removal of a defective driving member. The housing constitutes an enclosure or gate which is needed because its interior is in communication with the reaction chamber when the driving member is withdrawn from the flange. Such procedure is time-consuming, cumbersome and must be carried out by resorting to a large number of auxiliary parts.

SUMMARY OF THE INVENTION

An object of th invention is to provide a novel and improved sealing structure which invariably prevents communication between a contaminated area which accommodates one or more driven parts and an uncontaminated area which accommodates driving parts for such driven parts.

Another object of the invention is to provide a sealing structure which can be used to facilitate rapid, convenient and safe replacement of one or more driving parts which serve to transmit torque to one or more driven parts in the contaminated area.

A further object of the invention is to provide novel means for sealing a contaminated area from an uncontaminated area during replacement of one or more parts which transmit torque to driven parts in the contaminated area.

The improved sealing structure comprises a cell or enclosure having a wall which separates a contaminated compartment or area within the cell from an uncontaminated compartment or area at the outer side of the cell and has a preferably circular opening which extends between the two compartments, a sleeve which is located in the contaminated compartment and sealingly engages the wall around the opening, an axial passage provided in the sleeve in registry with the opening and an internal shoulder also provided in the sleeve and facing toward the contaminated compartment, a first rotary coupling member extending into the sleeve and having an external annular shoulder which sealingly engages the internal shoulder of the sleeve so that the latter constitutes a bearing for the first coupling member, an axial bore provided in the first coupling member and having a first end which is open toward the uncontaminated compartment and a second end which is sealed from the contaminated compartment by a transversely extending wall of the first coupling member, a rotary second coupling member provided in the uncontaminated compartment and having a torque-transmitting portion withdrawably extending into the bore of the first coupling member, and drive means for rotating the first coupling member by way of the second coupling member.

When the second coupling member must be detached from the first coupling member, the aforementioned shoulders prevent leakage between the two compartments. The likelihood of such leakage is further reduced by installing between the first coupling member and the sleeve a ring-shaped packing and by providing a liquid seal which is installed between the packing and the uncontaminated compartment. The liquid seal preferably comprises a receptable which fits into the opening of the wall and sealingly surrounds the second coupling member, and a supply of grease or the like in the chamber of the receptacle.

When the second coupling member requires inspection, repair or replacement, it is withdrawn from the first coupling member. At the same time, a suction-generating device evacuates air from the opening and preferably also from the annular chamber of an elastic U-ring which is installed between the sleeve and the first coupling member, preferably closely adjacent to the internal shoulder at that side which is nearer to the uncontaminated compartment.

The novel features which are considered as characteristic of the invention are set forth in particular in the appended claims. The improved sealing structure itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE is a central vertical sectional view of a fully assembled sealing structure which embodies the invention.

DESCRIPTION OF THE PREFERRED EMBODIMENTS

The drawing illustrates a sealing structure which comprises a horizontal wall 12 constituting the bottom wall of a cell which surrounds a contaminated compartment or area 10. The wall 12 separates this compartment from an evacuated uncontaminated lower compartment 11 and is provided with a circular opening 13 which extends between the two compartments. The opening 13 receives the smaller-diameter lower end portion of a bearing sleeve 14 which is located in the compartment 10 and has an axial passage 14a registering with the opening 13 and an internal annular shoulder 16 facing toward the compartment 10. The sleeve 14 is in tight sealing engagement with the wall 12 around the upper end as well as in the upper end portion of the opening 13.

The sleeve 14 serves as a bearing for a first rotary coupling member 15 which can transmit torque to one or more moving parts (not shown) in the contaminated compartment 10. The smaller-diameter lower end portion of the coupling member 15 extends into the sleeve 14 below the shoulder 16 and the latter abuts against an external annular shoulder 15a of the member 15. This member is further provided with an axial bore 15b the lower end of which is open toward the compartment 11 and the upper end of which is sealed from the compartment 10 by a transversely extending end wall 25. The upper portion of the axial passage 14a of the sleeve 14 receives an elastic annular packing 17 which is in sealing engagement with the external surface of the sleeve 14 as well as with the external surface of the coupling member 15. The smaller-diameter lower portion of the passage 14a accommodates an elastic U-ring 18 which is located immediate below the shoulder 16 and defines a ring-shaped chamber 19 in communication with the interior of an evacuating conduit 21 by way of a bore 20 in the ring 18. The conduit 21 extends through a side wall 22 of the cell and can be connected to a fan or another suitable suction-generating device SG. The conduit 21 further serves to withdraw air from the opening 13 below the sleeve 14 by way of bore 14b which is machined into the sleeve and communicates with the bore 20 of the U-ring 18. The intake end of the conduit 21 is sealingly fitted into the bore 20.

The axial bore 15b of the coupling member 15 removably receives the torque-transmitting upper end portion 23 of a second coupling member 37 which is installed in the compartment 11. A key 28 on the end portion 23 extends into an axially parallel internal flute of the coupling member 15 to insure that the latter rotates in response to rotation of the coupling member 37. The lower coupling member 37 is rotatable in a cylindrical casing 24 having an external annular shoulder 24a for the inwardly extending flange 27a of a connecting or retaining ring 27 which is separably secured to the underside of the wall 12 by bolts 27b or analogous fasteners.

The means for sealing the opening 13 from the space in the interior of the casing 24 and hence from the compartment 11 comprises a supply of liquid sealant 29' received in an annular chamber 29 defined by a receptacle which includes a metallic gasket 26 recessed into the upper end portion of the casing 24 and extending into the lower end of the opening 13, and a U-ring 26a sealingly engaging the internal surface of the casing 24 and the external surface of the coupling member 37 at a level below the gasket 26. The gasket 26 forms a cylindrical wall around the upper part of the chamber 29 for liquid sealant 29' (e.g., grease or oil).

The wall 12 is further connected with a ring-shaped plate 30 which is secured to the upper ends of several upright columns 31. The lower ends of the columns 31 are secured to a lower ring-shaped plate 32 which extends into a circumferential groove provided in a flange 33 which carries a gear motor 34. Th latter forms part of the drive means for the coupling member 37, and such drive means further comprises a safety clutch 36 which is driven by the output shaft 35 of th motor 34. The coupling member 37 constitutes the output member of the clutch 36. The clutch 36 receives torque from the shaft 35 by way of a key 38 and transmits torque to the coupling member 37 by way of a further key 39.

The lower end portion of the casing 24 defines with the safety clutch 36 an annular clearance or gap having a width $a$ and serving to receive a disk-shaped intercepting member 42 which is secured to and rotates with the coupling member 37. The purpose of the disk 42 is to intercept any such liquid sealant 29' which happens to leak between the U-ring 26a and the peripheral surface of the coupling member 37. The thickness of the intercepting disk 42 is less than the width $a$ of the aforementioned clearance so that the sealant can flow radially outwardly and, if necessary, overflows into a stationary annular intercepting trough 43 which surrounds the clutch 36 and can form an integral part of the flange 33 for the motor 34. The ring-shaped inner wall of the trough 43 extends upwardly beyond the outer wall and slopes downwardly and outwardly to direct the overflowing sealant into the annular chamber of the trough. The operator will note the pool or pools of grease on the upper surface of the intercepting disk 42 to be thereby informed that the liquid seal of the sealing structure is defective. If the operator fails to detect pools of grease on the upper surface of the disk 42, such grease overflows into and accumulates in the trough 43. The compartment 11 may accommodate suitable instruments (not shown) which automatically detect, record and/or indicate the presence of liquid sealant on the rotating intercepting disk 42 and/or in the chamber of the intercepting trough 43.

If the parts in the compartment 11 are defective, the illustrated sealing structure can be dismantled without permitting contamination of the compartment 11. In the first step, the suction-generating device SG is started to evacuate the chamber 19 and the lower part of the opening 13 by way of the conduit 21 and bores 14b, 20. In the next step, the operator removes the bolts (not shown) or analogous fastener means which secure the plate 30 to the underside of the wall 12. The coupling 36 is then free to be detached from the lower end portion of the coupling member 37, together with the plate 32, flange 33, motor 34 and intercepting members 42, 43. The operator thereupon removes the bolts 27b so that the retaining ring 27 can be separated from the wall 12, together with the casing 24, coupling member 37, gasket 26 and U-ring 26a. The torque-transmitting portion 23 of the second coupling member 37 is withdrawn from the axial bore 15b of the coupling member 15 in response to downward movement of the casing 24.

The compartment 11 remains properly sealed from the compartment 10 because the external shoulder 15a of the coupling member 15 bears against the internal shoulder 16 in the sleeve 14. Also, the end wall 25 seals the upper end of the bore 15b from the compartment 10. The parts 37, 24, 26 and the sealant 29' are thereupon removed from the compartment 11 by full consideration of the necessary precautionary measures and are replaced with new or satisfactory parts which are mounted on the wall 12 by reversing the aforedescribed sequence of steps. The compartment 10 remains sealed from the compartment 11 prior to attachment of a fresh casing 24 with a fresh supply of liquid sealant 29' because the shoulder 15a of the coupling member 15 cooperates with the internal shoulder 16 of the sleeve 14 and also due to the presence of packing 17 and U-ring 18. Thus, it is not necessary to resort to a pressure-equalizing housing or the like.

An important advantage of the improved sealing structure is that the coupling member 37 can be separated from the coupling member 15 with little loss in time and without the danger of leakage of contaminants from the compartment 10 into the compartment 11. Also, the coupling member 37 and the casing 24 may form part of a prefabricated encapsulated driving assembly which can be rapidly installed in the wall of a cell for one or more parts or groups of parts which must receive rotary motion, either continuously or at certain intervals.

Without further analysis, the foregoing will so fully reveal the gist of the present invention that others can by applying current knowledge readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

I claim:

1. In a structure of the character indicated, a combination comprising a wall separating the surrounding space into a first and a second compartment and having an opening extending between said compartments; a sleeve located in said first compartment and sealingly engaging said wall around said opening, said sleeve having an axial passage registering with said opening and an internal annular shoulder facing towards said first compartment; a first rotary coupling member extending into said sleeve and having an external annular shoulder adapted to be brought into sealing engagement with said internal shoulder, said first coupling member further having an axially extending bore open at one end towards said second compartment and an end wall sealing the other end of said bore from said first compartment; a resilient U-ring sealingly received in said sleeve and sealingly surrounding said first coupling member; a ring-shaped packing sealing surrounding said first coupling member and sealingly received in said sleeve; a rotary second coupling member located in said second compartment and having a torque transmitting portion withdrawably extending into said bore; and drive means for rotating said first coupling member by way of said second coupling member.

2. A combination as defined in claim 1, said ring defining an annular chamber and further comprising conduit means connected with said chamber and with said opening and suction-generating means connected to said conduit means.

3. A combination as defined in claim 1, wherein said second coupling member extends downwardly from said opening and further comprising a receptacle received in said opening and sealingly surrounding said second coupling member, a supply of liquid sealant in said receptacle, and intercepting means surrounding said second coupling member at a level below said receptacle to intercept liquid sealant in the event of leakage of such sealant between said receptacle and said second coupling member.

4. A combination as defined in claim 3, wherein said intercepting means comprises a disk surrounding said second coupling member and secured thereto for rotary movement therewith, and a stationary annular trough located below said disk to collect such coolant which overflows along the periphery of said disk.

* * * * *